(12) United States Patent
Smeets et al.

(10) Patent No.: US 11,551,371 B2
(45) Date of Patent: Jan. 10, 2023

(54) ANALYZING SYMMETRY IN IMAGE DATA

(71) Applicant: ICOMETRIX NV, Leuven (BE)

(72) Inventors: Dirk Smeets, Bierbeek (BE); Diana Sima, Haacht (BE)

(73) Assignee: ICOMETRIX NV, Leuven (BE)

( * ) Notice: Subject to any disclaimer, the term of this patent is extended or adjusted under 35 U.S.C. 154(b) by 0 days.

(21) Appl. No.: 17/276,388

(22) PCT Filed: Sep. 17, 2019

(86) PCT No.: PCT/EP2019/074771
§ 371 (c)(1),
(2) Date: Mar. 15, 2021

(87) PCT Pub. No.: WO2020/058221
PCT Pub. Date: Mar. 26, 2020

(65) Prior Publication Data
US 2022/0044435 A1 Feb. 10, 2022

(30) Foreign Application Priority Data

Sep. 17, 2018 (EP) ..................................... 18194961

(51) Int. Cl.
*G06T 7/68* (2017.01)
*G06T 7/13* (2017.01)
*G06T 7/40* (2017.01)

(52) U.S. Cl.
CPC ................. *G06T 7/68* (2017.01); *G06T 7/13* (2017.01); *G06T 7/40* (2013.01); *G06T 2207/30016* (2013.01)

(58) Field of Classification Search
CPC .... G06T 7/68; G06T 7/13; G06T 7/40; G06T 2207/30016; G06T 2207/10081; G06T 2207/10088
See application file for complete search history.

(56) References Cited

U.S. PATENT DOCUMENTS 7,043,066 B1 5/2006 Doi et al.
7,801,345 B2 9/2010 Fang et al.
(Continued)

FOREIGN PATENT DOCUMENTS

EP 1006732 A2 * 6/2000 ........... H04N 19/577
EP 2821968 A1 1/2015
WO 2012093353 A1 7/2012

OTHER PUBLICATIONS

Brummer, "Hough Transform Detection of the Longitudinal Fissure in Tomographic Head Images," IEEE Transactions on Medical Imaging, vol. 10, No. 1, Mar. 31, 1991, pp. 74-81.
(Continued)

*Primary Examiner* — Charles T Shedrick
(74) *Attorney, Agent, or Firm* — Workman Nydegger

(57) ABSTRACT

A method for analyzing an image to assess a degree of asymmetry in an object having a presumed mirror symmetry includes: retrieving an image of the object; obtaining a mirrored image by flipping along an axis that has an a-priori unknown spatial relation to the presumed plane of symmetry; obtaining a mapping between the retrieved image and the mirrored image; determining a measure of asymmetry in the object by considering element pairs of a first element of the retrieved image and a second element of the mirrored image according to the mapping. Obtaining the mapping comprises performing a rigid registration followed by a non-rigid registration of the retrieved image to the mirrored image. The measure of asymmetry is determined by calculating the Jacobian of the non-rigid deformation in each element of the image. The invention also pertains to a computer program product and an image processing system.

20 Claims, 3 Drawing Sheets

(56) References Cited

U.S. PATENT DOCUMENTS

2005/0027188 A1* 2/2005 Metaxas .................. G06T 7/12
600/410
2013/0289395 A1* 10/2013 Thiele .................. A61B 5/0042
600/425

OTHER PUBLICATIONS

Lee et al., "Building Skeleton Models via 3-D Medial Surface/Axis Thinning Algorithms," CVGIP: Graphical Models and Image Processing, vol. 56, No. 6, Aug. 10, 1994, pp. 462-478.
Ardekani et al., "Automatic Detection of the Mid-Sagittal Plane in 3-D Brain Images," IEEE Transactions on Medical Imaging, vol. 16, No. 6, Dec. 31, 1997, pp. 947-952.
Ourselin et al., "Reconstructing a 3D Structure from Serial Histological Sections," Image and Vision Computing, vol. 19, Jun. 27, 2000, pp. 25-31.
Chung et al., "A Unified Statistical Approach to Deformation-Based Morphometry," NeuroImage, Aug. 14, 2000, pp. 1-12.
Watkins et al., "Structural Asymmetries in the Human Brain: a Voxel-Based Statistical Analysis of 142 MRI Scans," Cerebral Cortex, vol. 11, No. 9, Sep. 30, 2001, pp. 868-877.
Chen et al., "Pathological Lesion Detection in 3D Dynamic PET Images Using Asymmetry," Proceedings of the 12th International Conference on Image Analysis and Processing, Sep. 17-19, 2003, 6 Pages.
Luders et al., "A Voxel-Based Approach to Gray Matter Asymmetries," NeuroImage, vol. 22, Jan. 21, 2004, pp. 656-664.
Cheung et al., "N-Sift N-Dimensional Scale Invariant Feature Transform," IEEE Transactions on Image Processing, vol. 18, Issue 9, Sep. 30, 2009, p. 2012-2021.
Scovanner et al., "A 3-Dimensional SIFT Descriptor and its Application to Action Recognition," Association for Computing Machinery, Proceedings of the 15th ACM international conference on Multimedia, Sep. 23-28, 2007, pp. 357-360.
Shi et al., "Hippocampal Volume and Asymmetry in Mild Cognitive Impairment and Alzheimer's Disease: Meta-Analyses of MRI Studies," HIPPOCAMPUS, Wiley-Liss, Inc., vol. 19, Mar. 23, 2009, pp. 1055-1064.
Chen et al., "Anomaly Detection through Registration," Pattern Recognition, The Journal of the Pattern Recognition Society, vol. 32, May 25, 1998, pp. 113-128.
Extended Search Report from corresponding European Application No. 18194961.1, dated Feb. 28, 2019.
International Search Report and Written Opinion from PCT Application No. PCT/EP2019/074771, dated Nov. 27, 2019.
Toga et al., "Mapping Brain Asymmetry", Nature Reviews Neuroscience, Janurary 31, 2003, vol. 4, No. 1, 21 Pages.

* cited by examiner

ANALYZING SYMMETRY IN IMAGE DATA

FIELD OF THE INVENTION

The present invention pertains to the field of digital image analysis, in particular to the analysis of medical images. More specifically, the present invention relates to a method of analyzing an image to assess a degree of asymmetry in an imaged object, and a related computer program product and image processing system.

BACKGROUND

In many medical disciplines, diagnosis and follow-up of diseases relies heavily on the interpretation of data obtained by medical imaging techniques. The human body shows a high degree of symmetry and deviation from this symmetry might indicate an abnormal condition. For example, the human brain is mostly left-right symmetric, and some neurological disorders like epilepsy, stroke, brain trauma cause the brain to be less symmetric.

Measuring asymmetry can be used to detect or better assess various types of neurological disorders. Currently, the diagnosis is mainly based on a visual assessment of different sections of the brain or organ to determine how symmetric they are. This comparison between different sections requires a field-specific expertise and is difficult to quantize. Hence, due to the subjective nature of the evaluations, comparing evaluations performed by different evaluators could be dangerous as inter-rater variability is typically large. Moreover, as described by Toga and Thompson, "Mapping brain asymmetry", e, (2003), 4(1), 37-48, some degree of asymmetry is considered normal. This degree might be different for gender, age and handedness. This further complicates the diagnosis.

Evaluating brain asymmetry based on medical images has been the topic of research before. Mostly, the asymmetry is assessed indirectly by measuring one or multiple anatomical structures in both hemispheres and comparing a corresponding feature in each corresponding structure, like the volume (feature) of the structure. An example is Shi et al, "Hippocampal volume and asymmetry in mild cognitive impairment and Alzheimer's disease: Meta-analyses of MRI studies", *Hippocampus*. 2009 November; 19(11):1055-64. This article summarizes the literature to compare the left and right hippocampal volumes in mild cognitive impaired subjects. The disadvantages of the approach are that it is does not allow to calculate dense asymmetry maps and that it is prone to a relatively large measurement error.

Secondly, asymmetry can be evaluated in group studies by transforming the scans of the individual to a common space (also referred to as the atlas) and mirror the images in atlas space. Using a statistical test, dense asymmetry maps, reflecting the group differences, can be calculated. Examples include Luders, et al. "A voxel-based approach to gray matter asymmetries", *Neuroimage* 22.2 (2004): 656-664 or Watkins et al., "Structural asymmetries in the human brain: a voxel-based statistical analysis of 142 MRI scans", *Cereb Cortex*. 2001 September; 11(9):868-77. This approach allows to determine asymmetries at the voxel-level, but is limited to group comparisons.

Finally, dense asymmetry maps could be measured at the individual level by mirroring the brain image around the its symmetry plane. Therefore, two approaches could be distinguished:

First and similar to performing group analyses, the asymmetry could be established by transforming the image to a standard space in which the symmetry plane is known. An example of such a method is known from international patent application publication no. WO 2012/093353 A1, in the name of Frank Olaf Thiele, entitled "Method of quantifying asymmetry of an object".

In the second approach the mid-sagittal plane is detected in the native space and the image is mirrored around that mid-sagittal plane. This second approach can be further subdivided in feature-based methods and symmetry-based methods.

Feature-based methods try to find the mid-sagittal plane by finding the fissure and fitting a plane through it. An example is Brummer, "Hough transform detection of the longitudinal fissure in tomographic head images", *IEEE Trans. Med. Imaging* 1991, 10, 74-81.

Symmetry-based methods define the mid-sagittal plane as the plane that maximizes the similarity between the brain and its reflection. An example is Ardekani et al., "Automatic detection of the mid-sagittal plane in 3-D brain images", *IEEE Trans. Med. Imaging* 1997, 16, 947-952 or U.S. Pat. No. 7,801,345 to Jing-Jing Fang et al., entitled "Method of quantifying asymmetry of an object". The main drawback of the symmetry-based approach is sensitivity to brain asymmetries and increased computational costs. The main advantage of this method is generalizability and adaptability to other medical image modalities.

This invention involves the unique approach to compute dense asymmetry maps in native space without finding the symmetry plane to mirror the image.

SUMMARY OF THE INVENTION

According to an aspect of the present invention, there is provided a method of analyzing an image to assess a degree of asymmetry in an imaged object having a presumed plane of mirror symmetry, the method comprising: retrieving an image of the object; obtaining a mirrored image by flipping the image along an axis of the image, in which this axis has an a-priori unknown spatial relation to the presumed plane of mirror symmetry of the object; obtaining a mapping between the retrieved image and the mirrored image; determining a measure of asymmetry in said object by considering a plurality of element pairs, each pair consisting of a first element of said retrieved image and a second element of said mirrored image corresponding to said first element according to said mapping.

The obtaining of the mapping comprises performing a registration of the retrieved image to the obtained mirrored image. The registration comprises a rigid registration, e.g. a rigid-body registration between the image of the object and the image of the mirrored object, followed by a non-rigid registration. Thus, a mapping can be obtained that eliminates position, orientation and asymmetry differences between the object and the mirrored object. As a result, the mapping includes all asymmetry information. The non-rigid registration comprises the finding of the local deformation between the object and the translated and rotated, mirrored object by maximizing the similarity between the image of the object and the deformed image of the mirrored object. The deformation can be described by a deformation field, which contains the deformation required to eliminate asymmetry. The measure of asymmetry is further (fully or partially) determined by calculating the Jacobian of the non-rigid deformation in each element of the image.

The presumed plane of mirror symmetry may refer to an anatomical plane of an animal or human subject for which a substantial symmetry of the body can be assumed, such as bilateral symmetry around the midsagittal plane. A-priori unknown refer to the projection of the presumed plane of mirror symmetry in the retrieved image being indeterminate to a substantial degree, even though some knowledge of the location and orientation of this projection may be approximately known, such as a position with an accuracy in the range of 2 mm to 5 cm (or more), and/or an orientation angle with an accuracy in the range of 2° to 15° (or more). While acquiring an image with such approximate alignment of the presumed plane of mirror symmetry can be easily achieved, e.g. using a standard orientation and position of the object when imaging the object, more precise knowledge of the position and orientation of the presumed plane of mirror symmetry is substantially more difficult to achieve.

The term "elements", as used herein, refers to elements of the image of the object, which may in particular be pixels (two-dimensional cases) or voxels (three-dimensional cases).

It is an advantage of the method according to the present invention that it allows to analyze dense asymmetry without the need to transform the image to the native space or to find the symmetry plane. The invention is based inter alia on the insight of the inventors that flipping the images along any axis (for 2D images, preferably horizontally or vertically), combined with a mapping, preferably a dense mapping, between the image and the flipped image provides correspondences between symmetrical points in the image.

In an embodiment of the method according to the present invention, said considering comprises: determining whether respective spatial relationships of said plurality of element pairs are consistent with a presumed symmetry around said plane of mirror symmetry.

It is an advantage of this embodiment that the degree of symmetry can be determined without performing any operations on the actual element values. Thus, "element pairs" are only considered in an abstract way, in that the mathematical structure of the obtained mapping may be considered without considering the element values.

Alternatively or additionally, said considering may comprise: determining whether an intensity level difference between elements in a given pair exceeds a predetermined threshold.

The invention is further based on an insight of the inventors that asymmetry can be defined either based on intensity differences or based on morphological differences. Indeed, the mapping itself contains the information of morphological differences.

In a method in accordance with embodiments of the present invention, the rigid-body registration may comprise a block matching algorithm or a volumetric feature-based matching algorithm.

A method in accordance with embodiments of the present invention may comprise segmenting the image and/or the flipped image, e.g. into anatomical regions.

A method in accordance with embodiments of the present invention may comprise geometrically simplifying the segmented image by an implicit surface representation and/or a skeletonization (e.g. to thin or reduce the segmented volume to a central representation).

In a method in accordance with embodiments of the present invention, the non-rigid registration may be determined based on the segmented image or the geometrically simplified segmented image.

In a method in accordance with embodiments of the present invention, the non-rigid registration may comprise a (numerical) optimization, in which a cost function and/or a regularization term of the optimization comprises a Jacobian of the deformation vector field.

In a method in accordance with embodiments of the present invention, said Jacobian may be calculated over segmented regions (e.g. by averaging over each region) of the segmented image or the geometrically simplified segmented image.

In a method in accordance with embodiments of the present invention, the cost function and/or the regularization term based on the Jacobian may be biased or penalized to take an assumed asymmetry for at least one of the segmented regions into account. For example, a soft constraint may be used to favor solutions for which the Jacobian is close to a value or in a value range that corresponds to an assumed degree of asymmetry.

The image may be two-dimensional or three-dimensional, whereby the elements of the image are pixels or voxels, respectively. The object of the image may comprise biological tissues or organs, in particular tissues of the central nervous system, more in particular brain tissue. The image may have been acquired by a medical imaging technique such as magnetic resonance imaging (MRI) or computed tomography (CT). Thus, for a 3D image, the flipping of the image along an axis of the image may refer to flipping the 3D image along a plane of the image.

A "rigid" registration or a "rigid-body" registration, is used for obtaining a mapping that eliminates position and orientation differences between the object and the mirrored object. The rigid-body registration comprises the finding of the translation and the rotation between the object and the mirrored object that maximizes the similarity between the image of the object and the transformed image of the mirrored object.

It is an advantage that the remaining differences between the object and the transformed, mirrored object can be attributed to object asymmetries. These remaining differences, attributed to object asymmetries, can be computed as the intensity difference between corresponding elements in the image and the transformed image, and represent a dense asymmetry map. Alternatively, the remaining differences can be computed as texture differences between the neighborhoods of corresponding elements in the image and the transformed image.

It is an advantage that the Jacobian determinant of the deformation field can be seen as a dense representation of asymmetries due to morphological differences. Hence, the Jacobian determinant in each voxel represents a dense asymmetry map. Alternatively, other properties of the deformation field can be used to describe the local asymmetry.

In an embodiment of the method according to the present invention, the image is segmented and an asymmetry index is calculated by averaging the measure of asymmetry over each segment of the image.

In this embodiment, the dense asymmetry maps are summarized in one or multiple asymmetry indices by averaging the measure of asymmetry (in particular, a dense asymmetry map, as may be obtained by calculating the Jacobian of a non-rigid transformation) over one or more image segments. Thereto, the original image is segmented into relevant segments. It is an advantage of this embodiment that the asymmetry can be studied in a segment of interest. In the particular embodiment with the object a human brain, the image segments can be anatomical structures in the brain, which might be asymmetrically affected by a disease.

In an embodiment of the method according to the present invention, the asymmetry index is compared with a database of asymmetry indices.

In this embodiment, indices may be compared with the asymmetry index values of a normative population. These values are extracted with the same methodology on a database of images. It has the advantage that it allows to distinguish normal asymmetry from abnormal asymmetry. Indeed, the human brain is not symmetric and has a certain degree of asymmetry.

In an embodiment of the method according to the present invention, the object is a brain and the image is a three-dimensional image.

The method of the present invention is particularly well suited for application to three-dimensional brain images as obtained by modern medical imaging techniques, in particular because asymmetries in the structure of the brain may be indicative of certain pathologies.

In a particular embodiment, the method according to the present invention further comprises the calculation of asymmetry indices in different anatomical regions.

This is of particular interest when the result of the inventive method is used as input for a diagnostic process.

According to an aspect of the present invention, there is provided a computer program product comprising code means configured to cause a processor to carry out the method as described above.

According to an aspect of the present invention, there is provided an image processing system comprising: an input interface adapted to receive the image of an object; a processor, operatively connected to said input interface; and an output interface, operatively connected to said processor and adapted to output results produced by said processor; and a memory, operatively connected to said processor and arranged to comprise code to be executed by said processor, said memory comprising code configured to cause said processor to carry out the method of any of claims 1-11 using said image of said object as input and said measure of asymmetry as said results.

The technical effects and advantages of embodiments of the computer program product and the image processing system according to the present invention correspond, mutatis mutandis, to those of the corresponding embodiments of the method according to the present invention.

BRIEF DESCRIPTION OF THE FIGURES

These and other technical aspects and advantages of embodiments of the present invention will now be described in more detail with reference to the accompanying drawings, in which.

DETAILED DESCRIPTION OF THE EMBODIMENTS

At a general level, the invention concerns analyzing an image to assess a degree of asymmetry in an imaged object having a presumed plane of mirror symmetry, by: retrieving an image of the object; obtaining a mirrored image by flipping the image along an axis of the image, in which this axis has an a-priori unknown spatial relation to the presume plane of mirror symmetry of the object; obtaining a mapping between the retrieved image and the mirrored image; determining a measure of asymmetry in said object by considering a plurality of element pairs, each pair consisting of a first element of said retrieved image and a second element of said mirrored image corresponding to said first element according to said mapping. Obtaining the mapping comprises performing a registration of the retrieved image to the obtained mirrored image. In which this registration comprises a rigid registration followed by a non-rigid registration.

Figure 1:
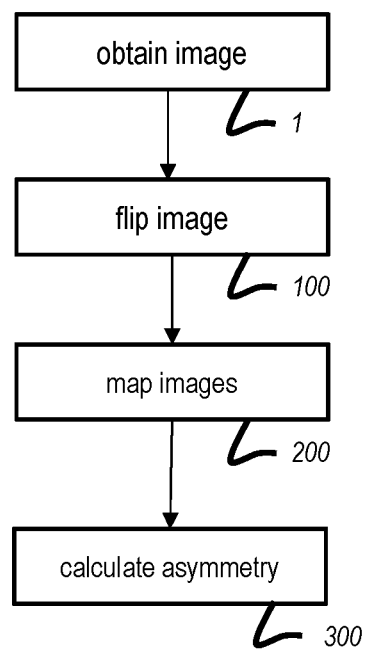
FIG. 1 provides a flow chart of a method according to an embodiment of the present invention.

FIG. 1 provides a flow chart of a method of analyzing image data according to a general embodiment of the present invention.

The illustrated method comprises obtaining 1 an image 10 of a part of an object. The image may be obtained from storage, or directly from an imaging device. The image may be further processed by masking the object 20 and correcting for bias field 30, which is frequently present in images obtained by MRI, before flipping the image. These steps provide the advantage that the asymmetries in the image introduced by the imaging technique are excluded, retaining only the asymmetries of the object itself. These steps may be performed by using methods generally known to the person skilled in the art.

The method further comprises flipping the image 100 along any axis of the image. Flipping the image may be done by reversing the order of the elements in one of the axes of the image.

In embodiments of the method according to the present invention, the image is flipped along any of the axes of the image by reversing the order of the image elements along that axis, obtaining an image of the mirrored object that is represented by the image. In particular embodiments, the flipping of a two-dimensional image along the horizontal axis (mostly referred to as the x-axis) results in an image of the mirrored object with the pixels having the same vertical position as in the original image and a reversed horizontal position. It is an advantage flipping along any axis of the image can be carried out very fast without the need for interpolation.

A mapping is obtained 200 between the image 10 and the flipped image 110. The mapping may be available from storage, or may be produced on the fly by applying a registration algorithm, which comprises a rigid-body registration 210, followed by a non-rigid registration 220.

The rigid-body registration 210 may comprise a block matching algorithm. In such block matching algorithm, a plurality of image blocks is considered, e.g. each block being a square of N×N pixels or a cube of N×N×N pixels (however, embodiments are not necessarily limited to square or cube blocks).

The blocks may be uniformly distributed over the image, e.g. the blocks of $N^2$ (or $N^3$) pixels (or voxels) may be spaced at M pixel (voxel) intervals over the image in each coordinate direction. However, embodiments are not necessarily limited to uniform sampling of the blocks over the image.

For each image block in a first image of the image 10 and the flipped image 110, a plurality of displacement steps in each coordinate direction are considered, e.g. displacements of $-k_x, -k_x+1, \ldots, 0, \ldots, k_x-1, k_x$ in a first coordinate direction and similar displacements in a second coordinate direction, and possibly in a third coordinate direction. The displacements (translations) are not necessarily limited to single pixel steps, e.g. may be spaced by multiple pixels between displacement steps, or may be fractional pixel steps (even though this may increase complexity due to resampling, e.g. requiring interpolation). Thus, for a 3D image, a total of $(2k_x+1)\cdot(2k_y+1)\cdot(2k_z+1)$ displacements may be considered, i.e. all combinations of each displacement step selection for each coordinate. The image block of the first image is then compared, by calculating a suitable similarity measure, with a corresponding block in the second image that is translated over each considered displacement. For example, the similarity measure may comprise a correlation coefficient, mutual information, a sum of squared differences, and/or another image similarity measure as known in the art. The displacement that corresponds to an optimum of the similarity measure, e.g. a maximum over all the displacements considered, may then constitute the displacement vector attributed to the block. It is an advantage that such block-matching strategy can be efficiently performed, e.g. is not computationally intensive.

The displacement vectors determined for all the blocks may be combined to estimate a global rigid-body transformation. For example, a rotation matrix and a translation vector may be determined, using an optimization strategy, such as a least-squares approach, that would result in a best match of the local displacements. For example, this global rotation and translation, when applied to the center of each block, would minimize the difference of the result of this translation and the coordinates of these centers when translated by their corresponding local displacement vectors, as previously determined. A more robust strategy than least-squares optimization may be used, such as Li-norm minimization, or using an M-estimator, in which the squared difference is replaced by a (e.g. convex) function of the absolute difference.

An exemplary block matching algorithm is described in Ourselin et al, "Reconstructing a 3D structure from serial histological sections," Image and Vision Computing, vol. 19, issues 1-2, pp. 25-31.

It is an advantage of this approach, that a robust estimation of the rigid transformation can be achieved. Since the orientation of assumed plane of symmetry is a priori unknown, a robust estimation (e.g. which is not, or only slightly, sensitive to local extrema in the cost function) is particularly desirable. This approach can also be implemented in a multi-resolution approach, in which, for example, the number of blocks, their size, their spacing and the displacement steps considered can be changed to refine a coarser rigid transformation determined in a previous step to a more finely grained determination of the rigid transformation.

Alternatively, the rigid-body transformation may be determined based on volumetric feature-based matching. For example, a scale-invariant feature transform (SIFT) method may be applied to extract and match distinctive scale-invariant salient features between the image and the mirrored image. As known in the art, such features may be based on (2D or 3D) image gradients, e.g. represented as spherical coordinates or as a polar representation, and/or local histograms of the intensity and/or the gradient, amongst other known alternatives. For example, Cheng et al, "n-SIFT: n-Dimensional Scale Invariant Feature Transform," IEEE Transactions on Image Processing, vol. 18, issue 9, pp. 2012-2021, describes an exemplary approach for SIFT-based matching to determine feature point correspondence between volumetric images. Once correspondences between feature points are established, these can be used to estimate a rigid-body transformation, e.g. as described hereinabove for the block-matching approach. Another example of a 3D SIFT descriptor that can be used in embodiments of the present invention can be found in Scovanner et al, "A 3-Dimensional SIFT Descriptor and its Application to Action Recognition," MM'07 Proceedings of the 15$^{th}$ ACM International Conference on Multimedia, pp. 357-360. It is an advantage of such approach that a robust registration can be achieved due to the invariance properties of the descriptor.

The method may comprise segmenting 400 the image 10 (or equivalently, the mirrored image). The segmentation 400 may also be carried out on both the image 10 and the flipped image, i.e. such that corresponding structures are identified in both images. For this segmentation, methods as known in the art may be applied, including straightforward thresholding, clustering based approaches, histogram based methods, edge detection, region-growing methods, level-set approaches, parametric or model-based methods, fast marching methods, variational methods, atlas-based methods, Markov random field methods, watershed transformation methods and/or other known methods. The segmentation may be automatic, semi-automatic or manual. Particularly, the image may be segmented, e.g. partitioned, into anatomically meaningful components (or equivalently, for non-medical images, structurally meaningful components).

The non-rigid registration 220 may be based on the segmentation 400. For example, the parameters of the non-rigid registration may be determined based on the segmented image or segmented images. It is an advantage that the segmentation may identify the asymmetry present in the image in a rough manner, which may be used to formulate an initial guess of the non-rigid transformation parameters or may be used to set hyperparameters of the non-rigid registration, such as a scale of the deformations being considered. For example, if the segmentation indicates that large asymmetries are present, the non-rigid registration may start at a coarser level than if only small asymmetries may be presumed based on the segmentation.

For example, the segmented image, i.e. the segmented components of the image, may be skeletonized, and the non-rigid registration 220 may be performed on the skeletonized image and its corresponding skeletonized mirrored image. Skeletonization refers to a process of thinning to reduce a structure, i.e. a segmented image component, to a geometrical abstraction, such as a medial surface or medial axis. An exemplary approach to skeletonization can be found in Lee et al, "Building skeleton models via 3-D medial surface/axis thinning algorithms," Computer Vision, Graphics, and Image Processing 56(6), pp. 462-478. Alternatively, the segmented image may be converted to another geometrical abstraction, e.g. a geometrical simplification of the segmentation components, such as defining an implicit surface representation and optionally reducing the complexity of the implicit surface representation. For example, such implicit surface representation may be determined by a distance map, a random walk function or similar approaches.

Thus, parameters of the non-rigid registration 220 may be determined by mapping the skeletonized or geometrically simplified segmented image onto a corresponding flipped (mirrored) representation of this skeletonized or geometrically simplified segmented image.

The inventors have found that, while some naturally occurring asymmetry may be present in images, these asymmetries typically do not strongly affect the essential morphology of the segmentation components, but may relate to differing orientations, shapes and/or volumes of segmentation components with respect to their mirror counterparts. By using the skeletonized segmented image, or otherwise geometrically simplified segmented image, as the basis for the non-rigid registration 220, an advantageously robust approach for non-rigidly registering the images can be achieved.

Figure 2:
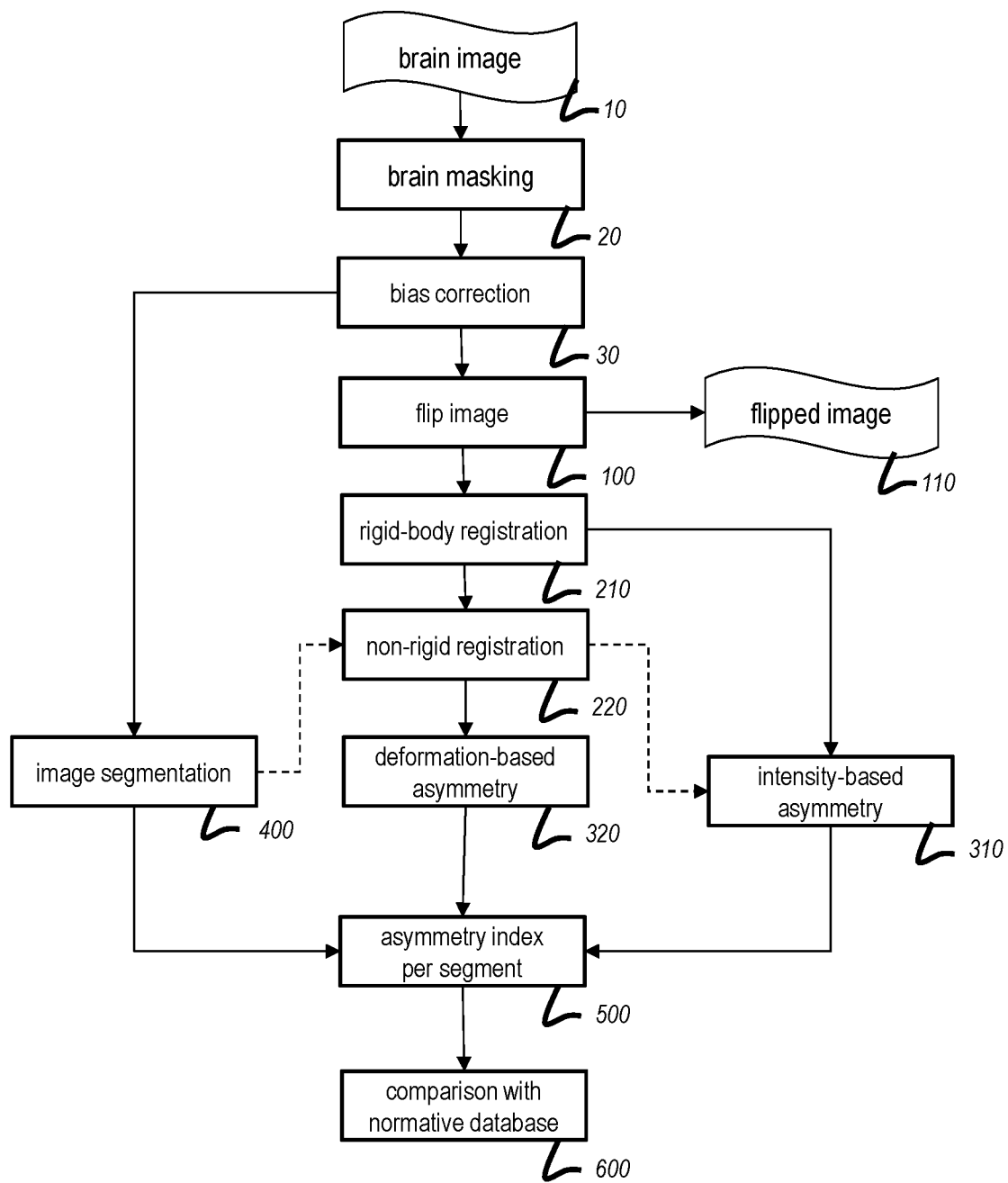
FIG. 2 provides a flow chart of a method according to another embodiment of the present invention.

The method further comprises calculating the asymmetry 300 in at least some of the elements of the image, and preferably in all the elements of the image. The asymmetry can be extracted from the intensities of corresponding elements 310 and/or from the deformations 320. In the embodiment illustrated in FIG. 2, both intensity-based asymmetry extraction and deformation-based asymmetry extraction are combined, but this is shown for illustrative purposes only and not to limit the invention.

Where the asymmetry is extracted from the intensities of the corresponding elements 310, the method may comprise determining whether the difference in intensity level between the corresponding elements exceeds a predetermined threshold. The threshold can be varied to vary the sensitivity of the method.

Furthermore, additionally or alternatively, a texture-based difference may be determined. For example, for a pair of corresponding pixels (as determined by the mapping), corresponding local neighbourhoods of these pixels may be compared, e.g. by a texture difference, to quantify the asymmetry.

Where the asymmetry is extracted from the deformations 320, the mathematical structure of the obtained mapping itself already reveals whether significant asymmetry is present. In mappings such as those obtained by non-rigid registration, the mapping may be expressed as a degree of deformation per element, without necessarily resulting in a table that associates specific elements of the original image with specific elements of the mirrored image. In a particular example, the Jacobian is calculated for the elements of the original image, whereby extreme values of the Jacobian are indicative of a high level of asymmetry.

Furthermore, the Jacobian of the deformation vector field can be used, in accordance with embodiments of the present invention, in a cost function or regularization term in the optimization to determine the non-rigid registration. This may have the advantageous effect of restricting the optimal non-rigid registration, as result of the non-rigid registration step, to feasible deformations. Since (the absolute value of) the Jacobian, i.e. the determinant of the Jacobi matrix, is representative of a factor by which the deformation vector field expands or shrinks a volume locally, it can be used in a cost function or regularization term to give a higher preference to deformations that maintain volume, i.e. assume symmetry, and/or to deformations which are feasible, e.g. to prevent negative values of the Jacobian that would invert parity (i.e. handedness, the orientation of features).

However, the inventors have also found that, when the non-rigid registration is determined using a segmented image, e.g. the skeletonized segmented image, use of the Jacobian as cost function or regularization term can offer an advantage in taking prior-knowledge of naturally occurring asymmetries into account. For example, hemispheric asymmetry of the hippocampal volume may be commonly observed population-wide. If an asymmetry is known to exist, e.g. in the example of the hippocampus, this objective or regularization term can be biased to preferentially select deformations that comply with this known asymmetry. For example, for the hippocampus, embodiments not being limited by this specific example, a preference for a deformation that expands or shrinks the volume of the lateral part of the hippocampus to map onto into contralateral counterpart by about 10% may be given a higher weight in the optimization by including a corresponding bias function in the regularization term or cost function component that represents the Jacobian for a (optionally skeletonized) segment that represents the corresponding structure.

After segmenting the image 400, the densely computed asymmetry 300 can be further summarized in one or multiple asymmetry indices 500. In one embodiment, the average value of the asymmetry map is computed for each image segment.

Finally, the asymmetry indices may be compared with the asymmetry indices of a reference population stored in a database 600.

The present invention also pertains to a system comprising an image processor configured to carry out the methods described above. The image processor may be implemented in dedicated hardware (e.g., ASIC), configurable hardware (e.g., FPGA), programmable components (e.g., a DSP or general purpose processor with appropriate software), or any combination thereof. The same component(s) may also include other functions.

Figure 3:
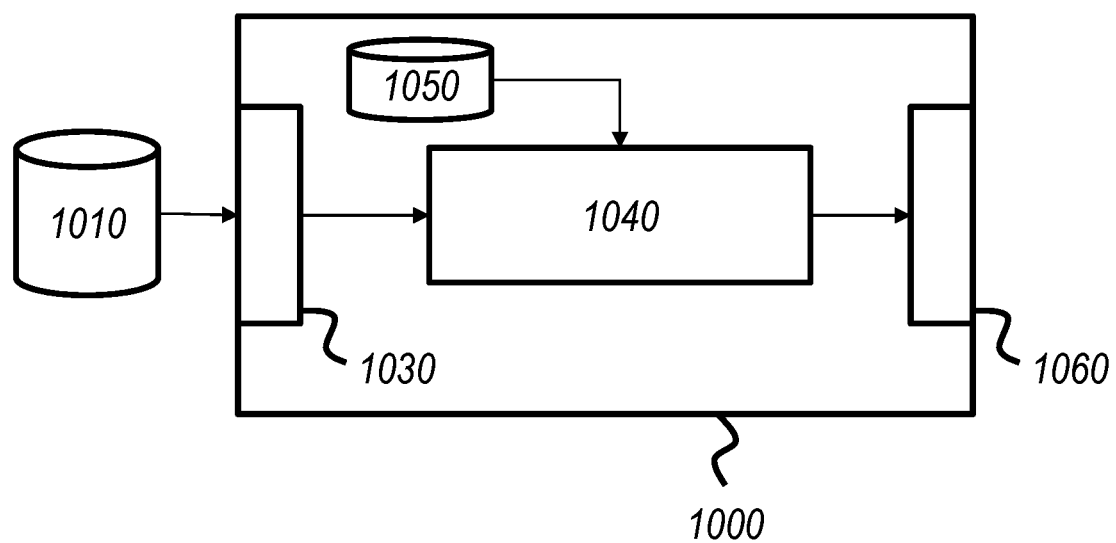
FIG. 3 schematically illustrates a system according to an embodiment of the present invention.

An exemplary design of such a system is schematically illustrated in FIG. 3. The system 1000 comprises an input interface 1030 adapted to receive the input image to be used from an image acquisition apparatus or a storage element. Without loss of generality, a single storage element 1010 is illustrated, representing a storage device for the input image. The system 1000 further comprises a processor 1040, operatively connected to the input interface 1030 and an output interface 1060. The processor 1040 is capable of running a program stored in memory 1050, which is configured to cause the processor 1040 to carry out the method according to the present invention.

The term "interface" is used to designate the combination of hardware and software or firmware required to allow an exchange of data between the processor 1040 and the components providing or receiving the corresponding data. The input interface 1030 and the output interface 1060 may share common hardware. In particular, the interface may be a local area network (LAN) interface, such as an interface according to the IEEE 802.3 "Ethernet" standard, on which appropriate network and transport protocols are implemented, such as a TCP/IP stack. The interfaces may provide access to a storage area network (SAN) or network attached storage (NAS), which is intended to store the input images to be used and/or the result of the analysis. The interfaces may provide access to a wide area network (WAN) such as the Internet, which includes other computers that provide the input images to be used and/or retrieve the result of the analysis.

The present invention also pertains to a computer program product comprising code means configured to cause a processor configured to carry out the methods described above. The computer program product may comprise a computer readable medium, such as a magnetic tape, a magnetic disc, an optical disc, a semiconductor memory, or the like, having the code means stored thereon.

While the invention has been described herein above with reference to specific embodiments, this was done to clarify and not to limit the invention. The skilled person will appreciate that various modifications and different combinations of disclosed features are possible without departing from the scope of the invention.

The invention claimed is:

1. A method of analyzing an image to assess a degree of asymmetry in an imaged object having a presumed plane of mirror symmetry, the method comprising:

retrieving an image of said object;
obtaining a mirrored image by flipping said image along an axis of the image, said axis having an a-priori unknown spatial relation to the presumed plane of mirror symmetry of the imaged object;
obtaining a mapping between said retrieved image and said mirrored image; and
determining a measure of asymmetry in said object by considering a plurality of element pairs, each pair consisting of a first element of said retrieved image and a second element of said mirrored image corresponding to said first element according to said mapping,
wherein said obtaining of said mapping comprises performing a registration of said retrieved image to said obtained mirrored image,
the registration comprising a rigid registration followed by a non-rigid registration,
wherein said non-rigid registration comprises an optimization,
wherein a cost function and/or a regularization term of said optimization comprises a Jacobian of the deformation vector field,
wherein the measure of asymmetry is determined by calculating the Jacobian of the non-rigid deformation in each element of the image, and
wherein the image is segmented and an asymmetry index is calculated by averaging said measure of asymmetry over each segment of the image.

2. The method according to claim 1, wherein said considering comprises:
determining whether respective spatial relationships of said plurality of element pairs are consistent with a presumed symmetry around said presumed plane of mirror symmetry of the imaged object.

3. The method according to claim 1, wherein said considering comprises:
determining whether an intensity level difference between elements in a given pair exceeds a predetermined threshold.

4. The method according to claim 1, wherein said considering comprises:
determining a texture difference between the neighborhoods of elements in a given pair.

5. The method according to claim 1, wherein said rigid-body registration comprises a block matching algorithm or a volumetric feature-based matching algorithm.

6. The method of claim 1, wherein said segmented image is geometrically simplified by an implicit surface representation and/or a skeletonization to thin or reduce the segmented volume to a central representation.

7. The method of claim 1, wherein said non-rigid registration is determined based on the segmented image or the geometrically simplified segmented image.

8. The method of claim 7, wherein said Jacobian is calculated over segmented regions of said segmented image or said geometrically simplified segmented image, and
wherein said cost function and/or said regularization term based on said Jacobian is biased or penalized to take an assumed asymmetry for at least one of the segmented regions into account.

9. The method according to claim 1, wherein the asymmetry index is compared with a database of asymmetry indices.

10. The method according to claim 1, wherein the object is a brain and the image is a three-dimensional image.

11. The method according to claim 1, further comprising the calculation of asymmetry indices in different anatomical regions.

12. A non-transitory computer readable storage medium comprising a computer program product comprising computer-executable instructions configured to cause a processor to carry out the method according to claim 1.

13. An image processing system comprising:
an input interface adapted to receive the image of an object;
a processor, operatively connected to said input interface; and
an output interface, operatively connected to said processor and adapted to output results produced by said processor; and
a memory, operatively connected to said processor and arranged to comprise code to be executed by said processor, said memory comprising code configured to cause said processor to carry out the method of claim 1 using said first image of said object as input and said measure of asymmetry as said results.

14. A method of analyzing an image to assess a degree of asymmetry in an imaged object having a presumed plane of mirror symmetry, the method comprising:
retrieving an image of said object;
obtaining a mirrored image by flipping said image along an axis of the image, said axis having an a-priori unknown spatial relation to the presumed plane of mirror symmetry of the imaged object;
obtaining a mapping between said retrieved image and said mirrored image; and
determining a measure of asymmetry in said object by considering a plurality of element pairs, each pair consisting of a first element of said retrieved image and a second element of said mirrored image corresponding to said first element according to said mapping,
wherein said obtaining of said mapping comprises performing a registration of said retrieved image to said obtained mirrored image,
the registration comprising a rigid registration followed by a non-rigid registration,
wherein said non-rigid registration comprises an optimization,
wherein a cost function and/or a regularization term of said optimization comprises a Jacobian of the deformation vector field,
wherein the measure of asymmetry is determined by calculating the Jacobian of the non-rigid deformation in each element of the image, and
wherein the image is segmented,
wherein said non-rigid registration is determined based on the segmented image or the geometrically simplified segmented image,
wherein said Jacobian is calculated over segmented regions of said segmented image or said geometrically simplified segmented image, and
wherein said cost function and/or said regularization term based on said Jacobian is biased or penalized to take an assumed asymmetry for at least one of the segmented regions into account.

15. The method according to claim 14, wherein said considering comprises:
determining whether respective spatial relationships of said plurality of element pairs are consistent with a presumed symmetry around said presumed plane of mirror symmetry of the imaged object; or determining whether an intensity level difference between elements in a given pair exceeds a predetermined threshold; or determining a texture difference between the neighborhoods of elements in a given pair.

16. The method of claim 14, wherein said segmented image is geometrically simplified by an implicit surface representation and/or a skeletonization to thin or reduce the segmented volume to a central representation.

17. The method according to claim 14, wherein an asymmetry index is calculated by averaging said measure of asymmetry over each segment of the image.

18. The method according to claim 17, wherein the asymmetry index is compared with a database of asymmetry indices.

19. The method according to claim 17, further comprising the calculation of asymmetry indices in different anatomical regions.

20. A non-transitory computer readable storage medium comprising a computer program product comprising computer-executable instructions configured to cause a processor to carry out the method according to claim 14.

* * * * *